United States Patent [19]

Handrus

[11] Patent Number: 4,467,744
[45] Date of Patent: Aug. 28, 1984

[54] APPARATUS AND METHOD FOR RAISING LOBSTERS

[75] Inventor: Jonathan D. Handrus, Carlsbad, Calif.

[73] Assignee: Mark C. Davidson, Los Angeles, Calif.

[21] Appl. No.: 428,983

[22] Filed: Sep. 30, 1982

[51] Int. Cl.³ ............................................. A01K 61/00
[52] U.S. Cl. ......................................................... 119/2
[58] Field of Search ..................................... 119/2, 18

[56] References Cited

U.S. PATENT DOCUMENTS

3,952,703  4/1976  Erfeling .................................. 119/18
4,337,727  7/1982  Mickelsen et al. ........................ 119/2

Primary Examiner—Hugh R. Chamblee
Attorney, Agent, or Firm—Poms, Smith, Lande & Rose

[57] ABSTRACT

An apparatus and method for raising lobsters in multi-cellular cages in which each cage has a feedport and a food-carrying member is adapted to be inserted into and through the feedport. The method includes lifting the cage out of the water contained in a holding tank, removing uneaten food through the feedport from each cage, washing away any unused food, supplying a food substance to the food-carrying member in such a manner that the food substance is encapsulated thereon, returning the food-carrying member to the cage and then lowering the cage into the water of the holding tank. Apparatus includes manual or automated operable structures in which a large number of food-carrying members can be treated at the same time, the apparatus including a hoist carried by a gantry for lifting successive cage means from the holding tank as the gantry moves along the holding tank, a manipulating structure on the gantry for attachment to a plurality of food-carrying members and removing them from the cages, the manipulating structure being positionable at a cleansing station and at a food replenishment station before being positioned for return to the cages with the new food substance thereon.

25 Claims, 7 Drawing Figures

APPARATUS AND METHOD FOR RAISING LOBSTERS

BACKGROUND OF INVENTION

The present invention relates to an apparatus and method for raising lobsters or other crustaceans such as shrimps, crabs, crayfish and the like and is particularly directed to the crustaceous cannibalistic variety.

In the natural growing habitat of crustaceans such as lobsters adjacent Maine and Nova Scotia, seven to ten years may be required for a lobster to reach a marketable weight of one pound. In such a natural habitat, the growth rate of a lobster is slow and uncertain because the surrounding ocean environment causes a relatively high mortality rate. It has, therefore, been contemplated to raise lobsters under controlled aquaculture systems in which the growing period of a lobster may be substantially reduced by carefully regulating the environmental conditions of the lobsters as by regulating water temperature, avoiding water pollution, assuring proper salt content of the water, and providing a selected optimum diet and care of the lobsters during the post-larval stage. By such careful control of the environment of post-larval lobsters, it is believed possible to raise a one pound lobster in a period of from 21 to 30 months. In addition, it is contemplated that there may be a new market for lobsters of quarter pound size similar to that of baby shrimp.

It will also be readily apparent that to commercially raise the many thousands of lobsters required to satisfy the demand therefor, an efficient, effective means for feeding a large number of lobsters must be provided. The physical arrangement of daily feeding a large number of lobsters held in individual, separate cells presents numerous problems since uneaten food must be timely disposed of before spoiling and endangering the health of the lobsters and the manner of transporting and presenting the food substances to a large number of individual cells must be accomplished in a foolproof, efficient and effective manner. Since the raising of lobsters requires feeding at least once every 24 hours, the arrangement for feeding lobsters becomes extremely important. Thus feeding and caring for thousands of lobsters, each in an individual cell, presents a number of problems.

Prior proposed apparatuses and methods for aquaculture of cannibalistic varieties have included separate habitats for each of the crustaceans by providing a clear, transparent, rigid plastic tube in which a number of discs or shelves of plastic material are arranged in vertical spaced relation to form a plurality of vertically disposed separate chambers, each chamber to contain a baby lobster. Feeding of the lobsters in separate chambers included use of a vertical feed rod having small notches therealong to retain small elements of food, the feed rod being adapted to be lowered into each of the chambers for making the food accessible to the lobsters. Thus one feed rod may supply food to 10 to 20 cells (see U.S. Pat. No. 3,815,546).

Another prior proposed aquaculture system is shown in U.S. Pat. No. 3,916,833 in which vertical and horizontal rows of cells are provided for individual raising of lobsters, the walls of the cells being perforated for circulation of water and the floor of lobsters in each cell comprising a wire mesh which permitted the feeding of each cell by allowing the food to descend through water by gravity and to be caught on a small tray in each cell, the tray of each cell being horizontally offset from the tray thereabove. Mass gravity feeding of a plurality of cells in this manner was haphazard—the trays may catch different amounts of food.

Another arrangement of cages with cells for individual raising and feeding of separated lobsters is shown in U.S. Pat. No. 3,499,421, the cages being movable between a submerged position in water and an out of the water servicing position. Still other arrangements of aquaculture systems for individual raising of crustaceans, such as lobsters, are described in U.S. Pat. Nos. 4,212,268, 4,300,477, 4,007,709.

SUMMARY OF INVENTION

The present invention therefore relates to an aqua culture apparatus and method for raising crustaceans, such as lobsters, wherein the apparatus is so arranged and constructed as to facilitate the feeding of a large number of lobsters at one feeding operation, to provide a plurality of separate transparent cells in a movable cage, and to provide a manual or automated system including a machine operable to simultaneously operated to feed the lobsters contained in the plurality of cells in the cage.

The invention particularly contemplates a feed means for a multicellular cage means for crustacean animals in which each cell has a feed port, the feed port being arranged in vertical and horizontal rows to facilitate association therewith of a feed plate member having a plurality of feed pegs extending from one face thereof in spaced relation corresponding to the spacing and arrangement of the feed ports of the cells. Each of the pegs are adapted to carry a food substance which may be physically bonded to the peg by a substance in which the food on the peg is dipped to form a film thereover which encloses, retains and contains the nutrients of the food substance therewithin. The feed plate with the feed pegs thereon is adapted to be aligned with the feed ports of the cells and moved toward the cells so that feed pegs are insertable through the ports and into the cells and accessible to the baby lobsters. The number of cells in a cage means and the amount of feed pegs are correlated, in one example 160 or more lobsters are fed in one cage means.

The invention further contemplates a novel method of feeding at one time a plurality of lobsters in a plurality of individual cells which includes the steps of: lifting each cage out of a holding tank, removing a feed plate with feed pegs from the plurality of cells in one motion; cleaning the feed pegs, replenishing the food on the feed pegs by dipping the feed pegs into a supply of food substances, binding the food onto the pegs and then reinserting the food carrying pegs into the feed ports of said cells.

A primary object of the present invention therefore is to provide a novel apparatus and method for feeding and caring for crustaceans such as lobsters and the like.

An object of the invention is to provide a cage means having a plurality of cells in separate independent relation, each with a feed port and with perforated walls to permit circulation of water and means for feeding of adjacent cells through their feed ports at the same time.

Another object of the present invention is to provide a feed plate or member having a plurality of feed pegs thereon, each feed peg being arranged and adapted to be associated with one of the cells in the cage means.

A further object of the invention is to provide a novel peg feeding method in which, after the pegs are withdrawn from the cells, the pegs are cleaned of uneaten food, the cleaned pegs being then dipped into a food mixture which contains alginate, and after removing from the food mixture, the pegs with food thereon may be dipped into a calcium chloride solution for example, in order to form a film on the food to prevent escape of nutrients from the food substance and to also physically bind the food to the peg. The pegs are redipped into clean water to remove any excess calcium chloride and the feed plate or member may then be reassociated with the cage means for feeding of the lobsters.

Another main object of the invention is to provide an apparatus for the maintenance, care and feeding of crustaceans held in a cage means as mentioned above and provided with a feed plate member and wherein the plate member may be readily manipulated, either manually or by automated means to clean the feed pegs and to replenish the food on the feed pegs for reinsertion into the cage means before lowering into the holding tank. The cycle of lifting the cage means from a holding tank, removing the feed plate member, replenishing food thereon, and reassemblying the feed plate with the cage means, lowering the cage means into the holding tank may be accomplished in a limited time so that exposure of crustaceans in the cells in an out of the water environment is short and not harmful to the animals being fed.

Various other objects and advantages of the present invention will be readily apparent from the following description of the drawings in which an exemplary embodiment of the invention is described and shown.

DETAILED DESCRIPTION OF INVENTION

Figures 1, 3:
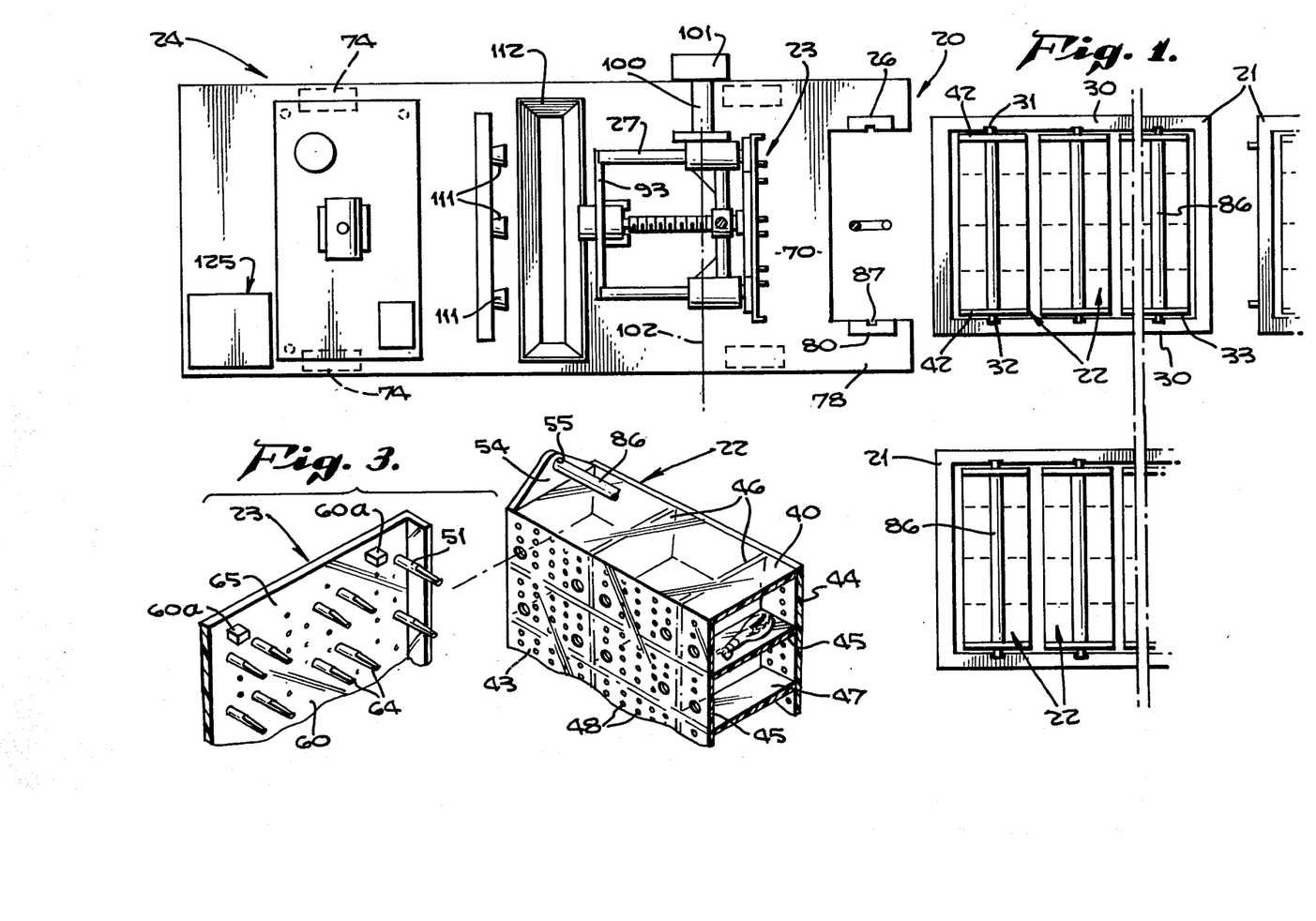
FIG. 1 is a schematic top plan view of an apparatus adapted for automatic operation embodying this invention and illustrating an exemplary arrangement of holding tanks for a plurality of cage means.
FIG. 3 is a fragmentary, perspective view of a cage means and feed plate member embodying the invention and contained in said holding tanks.
Figure 2:
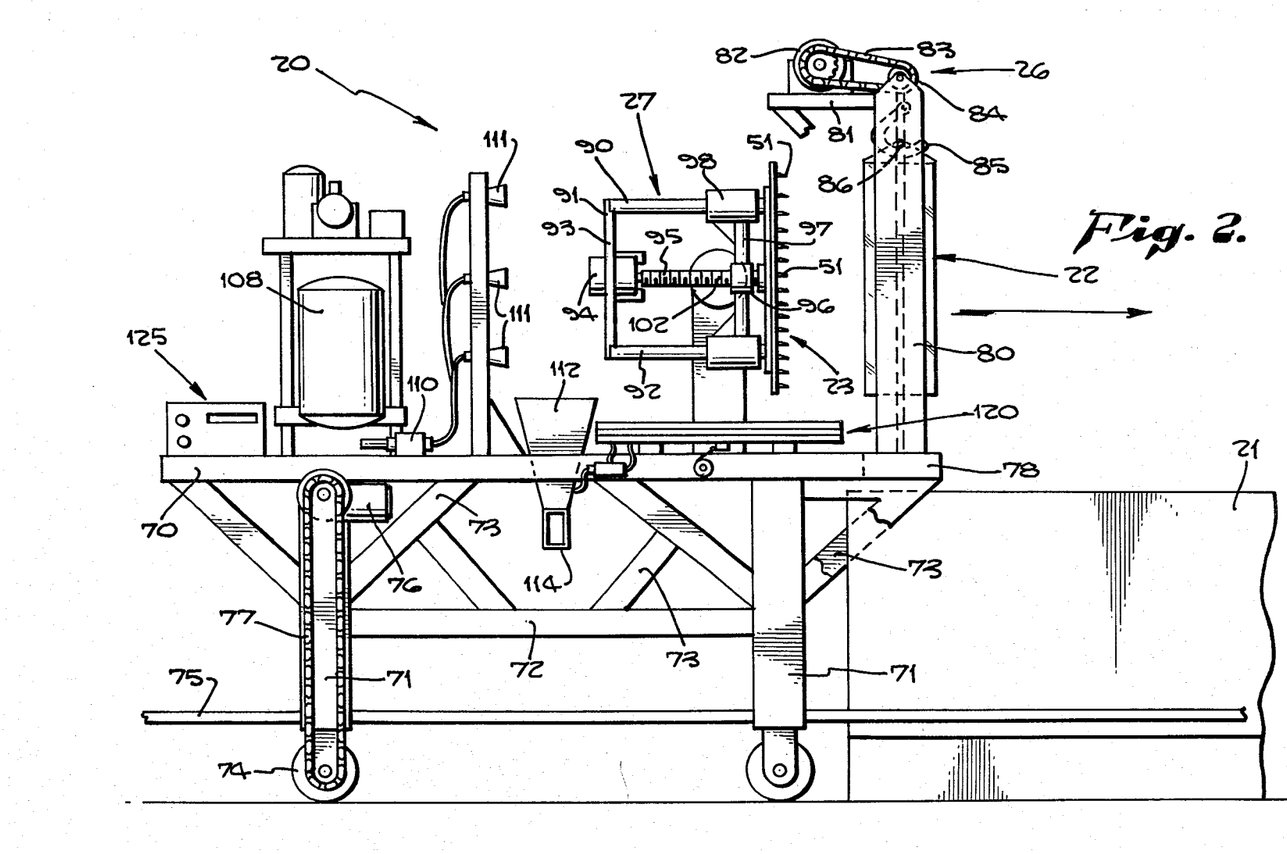
FIG. 2 is an enlarged, fragmentary side elevation of the apparatus shown in FIG. 1, the gantry means shown being advanced partially over one end of one of the holding tanks.

In FIGS. 1 and 2, a system or apparatus embodying the present invention is generally indicated at 20. The system generally includes one or more holding tanks 21 arranged in one or more rows and in alignment, a plurality of cage means 22 with associated feed rack or plate means 23 within each tank; a gantry means 24 adapted to move along and span a row of holding tank means 21 the gantry means being provided with means for handling each cage means and feed rack means 23 to facilitate the feeding and care of a plurality of lobsters being raised in each cage means. The gantry means may include a hoist means 26 for removal and replacement of each cage means 22 in holding tank 21, a multipositioning means 27 for moving the feed rack means 23 between a first position for removal and attachment of the feed rack to the cage means, a second position for cleaning and washing the feed rack means, and a third position for attachment and retention of suitable food substances to the feed rack means 23. It will be understood that the system 20 generally indicated and described above may be manually operable or automated so that the gantry means may progress along the line of holding tanks and automatically remove, manipulate and then return each cage means in the holding tank. There may be some slight changes in structure to facilitate manual operation and is contemplated by the invention and its method of feeding and raising lobsters.

Each holding tank 21 may be made of suitable material such as fiberglass compositions and of a size to readily accommodate therewithin a plurality of cage means 22 arranged in parallel and in a row. Each holding tank 21 may be provided with side walls 30 having on their interior surfaces aligned vertical slot means 31 for guiding cooperation with vertical ribs 32 at opposite ends of each cage means 22 for positioning the cage means in selected spaced relation within the holding tank and for providing a selected distance therebetween to facilitate incremental or step by step movement of the gantry means 24 therealong for precise positioning of the hoist means 26 with respect to each cage means 22 in the holding tank. Each holding tank is provided with an open top 33 to provide convenient access for lifting and lowering of cage means 22 out of and into the holding tank.

Each holding tank is adapted to contain a desired amount of water suitably heated and treated to provide optimum water conditions for the raising of lobsters. The water supply, the water connections to the holding tanks, and the treatment of the water including filtering means therefor are not shown in the drawings or described herein because such functions are well known in the raising of crustaceans and do not form a part of this invention. It may also be noted that in FIG. 1 two rows of holding tanks are schematically illustrated and it will be understood that the holding tanks may be arranged in any desirable pattern or number suitable for their association with the gantry means 24 in the available space.

Cage means 22 is fragmentarily illustrated in FIG. 3. Each cage means 22 may be made of rigid transparent sheet material of a thermosetting resin such as an acrylic resin and known under various trademarks, for example, "Plexiglas". Each cage means 22 is provided with a top wall 40, a bottom wall of identical shape, not shown, end walls 42 and front and back side walls 43 and 44. Extending from the front wall 43 to the back wall 44 are a plurality of vertically spaced horizontal walls 45 and a plurality of horizontally spaced vertical partition walls 46 which define separate individual cage cells or chambers 47. Since all of the walls are transparent, light entering the holding tank is transmitted to and may permeate all of the cells 47. Transparency of the walls is a significant characteristic of the cage means inasmuch as crustaceans, including lobsters, appear to grow faster in clear surroundings and do not apparently feel confined.

Each of the front and rear walls 43 and 44 are provided with a plurality of perforations 48 of suitable diameter in order to permit the ready flow of circulating water in the tank through the cells and through the perforations. Front wall 43 is provided with a feed port 50 for each of the cells 47, the feed ports 50 being located in vertical and horizontal rows and in a uniform arrangement. Feed port 50 is of sufficient diameter to provide a relatively loose tolerance for introduction of feed pegs 51 provided on feed plate means 23.

Rear wall 44 may be removable from the cage means structure by releasing suitable retaining screws or fasteners to provide access to cells 47 for removal of lobsters therein or for introduction of baby lobsters at the beginning of their growing period.

In one example, cage means 22 may include as many as 162 cells arranged in nine vertical rows, 18 cells to each row. An exemplary cell may have a dimension of approximately 2 inches high, 4 inches wide, and $6\frac{1}{2}$ inches deep. Each end wall 42 of each cage means may include an upstanding, triangular extension 54 above top wall 40 and provided with a hole 55 for reception of one end of a lifting bar or rod 56 engageable by a lifting means provided on the hoist means 26. The outer dimensions of the cage means are correlated with the interior dimensions of holding tank 21 so that the cage means can be readily lifted from the holding tank and returned by the hoist means 26. In some constructions of cage means 22, a similar cage means may be placed back to back for a cage construction of approximately 324 cells. In such construction, both front and back walls would be removable and a center vertical partition provided to divide the cage means into two vertical halves. It will be understood that the size of the cage cells 47 may be varied depending upon the crustacean to be raised; in one example of such cage means for lobsters, the cells 47 may be small enough to grow the lobsters to a quarter pound size or such cells may be enlarged to facilitate the raising of lobsters to $1\frac{1}{2}$ to 2 pounds. If lobsters are to be raised to the larger size in addition to the smaller size, it may be more desirable to use a smaller cells suitable for raising lobsters to $\frac{1}{4}$ pound and then transfer the smaller lobsters to the large cells for raising the lobsters to the larger size or 2 pounds.

Figures 4, 5, 6, 7:
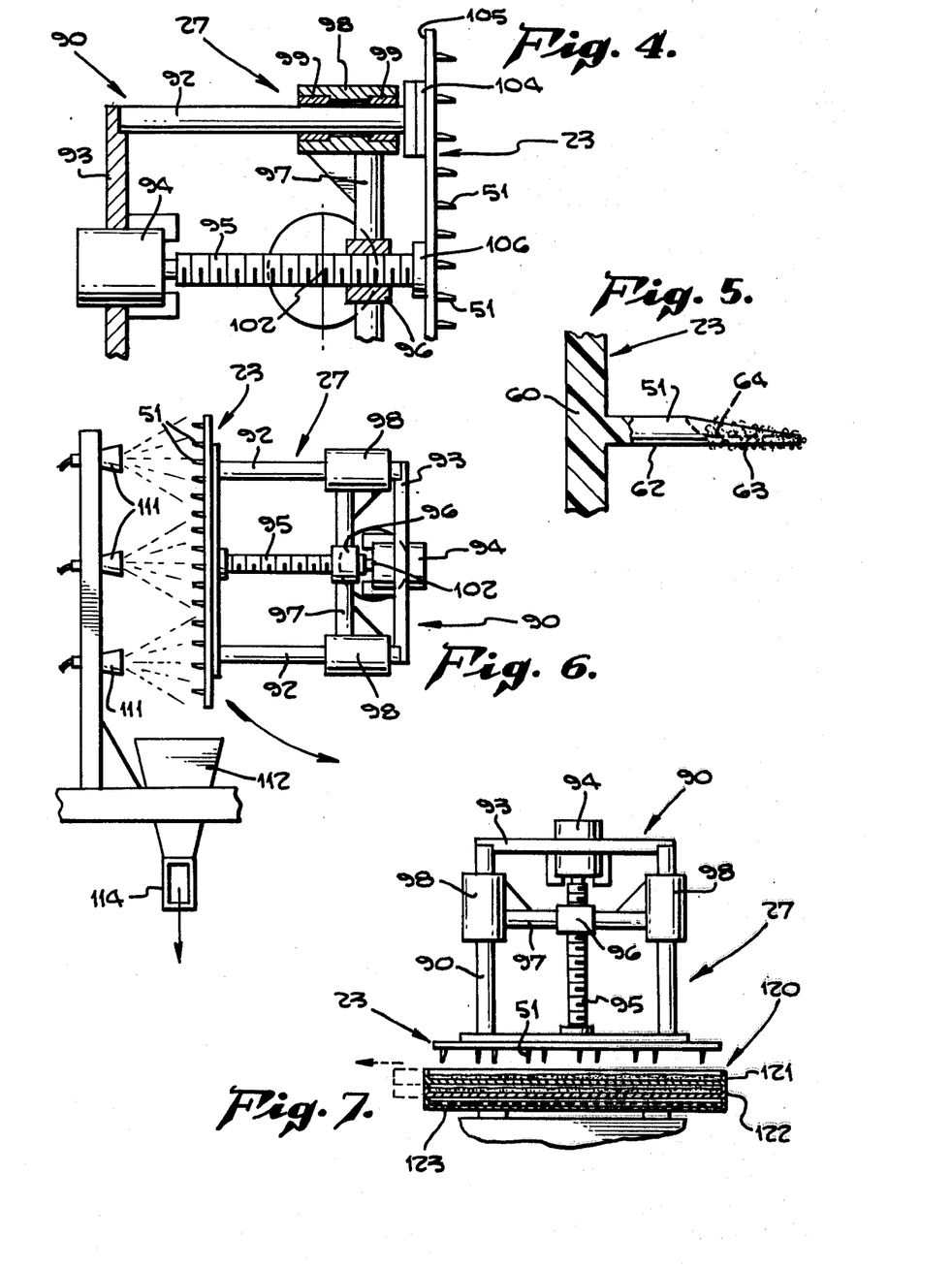
FIG. 4 is a fragmentary, enlarged view, partly in section, taken in a vertical, longitudinal plane bisecting the manipulating means for the cage means.
FIG. 5 is an enlarged fragmentary view, partly in section, of a feed peg carried on the feed plate member shown in FIG. 3.
FIG. 6 is a fragmentary side elevational view of the apparatus for handling the feed plate member and showing the feed plate displaced 180 degrees from the position shown in FIG. 4 and at a cleaning station.
FIG. 7 is a fragmentary sectional front view of the feed plate member handling apparatus, the apparatus being shown in a position for replenishing the food substance on the feed pegs, the phantom lines indicating displaced positions of the feed trays.

In FIG. 3 is also shown a fragmentary view of a feed plate means 23 also made of transparent plastic material similar to that of the walls of cage means 22. Feed plate means 23 may include a wall 60 of a length and width corresponding to the length and width of wall 43 of cage means 22. At vertical side edges of wall 60 may be edge flanges 61 having a selected width to facilitate embracing a portion of the edge walls of cage means 22 for accurate registration horizontally of feed plate means 23 with the cage means 22. Projecting from the inner face of wall 60 may be a plurality of feed pegs or food carrying elements 51 arranged in spaced relation corresponding to the spaced relation of feed ports 50 in wall 43 so that each feed peg 51 may be aligned with and pass into and through a corresponding feed port in wall 43. Each feed peg 51 may be made of the same material as wall 60 and includes a cylindrical base portion 62 and a gradually tapering end portion 62 adapted to extend completely into a cell 47 when the feed plate means 23 is assembled with cage means 22. The end portion 63 may be hollowed or longitudinally recessed as at 64 to facilitate the carrying of food substances on the feed peg end portion 63.

In assembly of feed plate means 23 with cage means 22, a feed peg 51 extends into each feed port 50 which may be of slightly greater diameter than the outer diameter of the cylindrical portion 62. Wall 60 is supported by the plurality of feed pegs in spaced relation to the outer surface of wall 43 by spacer elements 60a. When feed plate means 23 is in registry and in assembly with cage means 22, a plurality of perforations 65 arranged in wall 60 to correspond with the arrangement of the ports 48 in wall 43 further facilitate circulation of water through the aligned and registered ports 65 and 48.

Gantry means 24 for handling each cage means 22 and for removing and handling feed plate means 23 may comprise a suitable gantry structure comprising a floor or deck 70 supported by vertical legs 71 provided with reinforcing members and braces generally indicated at 72 and 73 in such a manner that the legs 71 and floor 70 may move alongside and over the holding tanks 21 and progress along the length of the holding tank in a step by step fashion for positioning to raise and lower each cage means 22. Each leg 71 may be supported on suitable wheels 74 and a pair of guide bars or rails 75 are provided on opposite sides of each tank 21 to precisely position the gantry means 24 in relation to each holding tank 21. Wheels 74 may be flanged to engage and roll along a track, not shown, if so desired, in order to accurately guide the gantry means 24. A motor 76 may be provided at one end of gantry means 24 and outboardly of the space required for passage of the gantry means 24 along a tank 21, the motor means being suitably connected to a drive chain 77 having a sprocket driving connection with wheels 74 at one end of the gantry means 24.

At the forward end 78 of the gantry means 24 may be provided a hoist means 26 which comprises a pair of upstanding side columns 80 amd a transverse member 81 at the top thereof. A suitable motor 82 for driving a drive chain 83 is connected with a winch mechanism 84 for raising and lowering a hoist hook member 85 for engagement with a transverse bar or rod 86 which interconnects extensions 54 of the end walls on each cage means 22. The inboard surfaces of columns 80 may be provided with vertical channels 87 for cooperation with the guide ribs 31 on each cage. When hook 85 is lowered and engaged with bar 86 and the gantry is stopped in its preselected position, lifting of the cage means 22 from its selected position in holding tank 21 will permit engagement of the cage end ribs 31 with the channels 87 in the columns 80 so that the cage means may be vertically raised and prevented from swinging or swaying about its vertical axis. The hoist means 26 raises the cage means 22 to a preselected height readily selected by a stop means provided on the inboard surfaces of the columns 80. The floor 70 at the front end 78 of the gantry means is provided with an opening 89 for reception of the cage means 22 when the front end 78 of the gantry means is positioned over the adjacent end of holding tank 21 as shown in FIG. 2. Thus as the gantry means moves along tank 21, the hoist means has clearance with respect to floor 70 for the removal and return of a cage means from and to a holding tank 21.

Means 27 for manipulating and handling the feed plate means 23 into and out of different positions to facilitate the simultaneous withdrawal, washing, and supply of food to the plurality of feed pegs on the feed plate means 23 may comprise a pivotal and retractable structure 90 supported above the gantry floor 70 and inwardly of the front end portion 78. Means 90 may comprise a frame 91 having four parallel spaced horizontal members 92 extending longitudinally of the gantry means and interconnected at their rear ends by vertical and horizontal members 93. Frame 91 carries a motor means 94 supported by rear members 93, motor 94 driving a feed screw 95 which is engaged by a feed nut 96 having spider arms 97 connected to housings 98. Housings 98 include internal bearings 99 for slidable movement of frame 91 parallel to the axis of feed screw 95. Feed screw nut 96 is connected with and supported by a pair of trunnion means 100 carried by suitable upstanding posts 101 connected to the gantry means 24 at the floor 70. Trunnion means 100 permit the frame 91 to be rotated about a horizontal transverse axis 102.

As indicated in FIGS. 1, 2 and 4, the forward end of frame members 92 along which the bearings means 99 slide may carry vacuum or suction devices 104 for suction contact with an outer unperforated surface 105 of the feed plate means 23. The end of feed screws 95 may be provided with an abutment block 106 against which feed plate means 23 may be abut and positioned.

When cage means 22 is raised to its selected height as shown in FIG. 2, motor 94 may be actuated to advance the suction cups 104 carried by the frame 91 to contact and engage surface 105 of the feed plate means while it is assembled with the cage means 22. A vacuum tank 108 connected by a suitable flexible line to the vacuum suctions devices 104 on frame 91 may be actuated to apply suction thereto so that the suction devices 104 are firmly supportively engaged with the feed plate means 23. Upon reversal of the feed screw 95, it will be apparent that the feed plate means 23 is withdrawn from its assembled engagement with the cage means 22 and the feed pegs 51 are withdrawn from the cells 47. When the feed plate means 23 reaches the position of approximately that shown in FIG. 2, the frame 91 may be rotated in a clockwise direction about a transverse horizontal axis 102 until the feed plate means 23 rotates through 180 degrees and reaches the position shown in FIG. 6, after being displaced by the feed screw in a rearward direction to the position shown in FIG. 6.

Means for subjecting feed pegs 51 to suitable cleaning and washing solutions may comprise a suitable source of such cleaning solutions (not shown) connected to a pump means 110 for causing a relatively high velocity spray to be ejected from nozzles 111. Nozzles 111 may be arranged in any suitable pattern to provide direct forceable impingement of the spray upon the entire surface area of the feed plate means and feed pegs facing the spray nozzles. A suitable drain 112 may be provided in floor 70 and run off solutions may be conveyed through suitable ducts 114 to a disposal tank or area.

After subjecting the feed plate means 23 to the spray of cleaning solutions in order to remove all particles of uneaten food from the feed pegs, the frame 91 may be rotated counter clockwise about axis 102 until it is in a downwardly facing horizontal position as shown in FIG. 7.

In the position of FIG. 7, feed plate means 23 is disposed with the feed pegs 51 directed downwardly and facing an open topped tray means 120 divided into three horizontal tray sections 121, 122 and 123. The upper tray section 121 contains a supply of food substance for the crustaceans, the middle tray section 122 may carry a suitable bonding agent for affixing the food to the feed pegs 51, and the bottom tray section 123 may contain water. Tray sections 121 and 122 may include spaced channels arranged in the pattern of the feed pegs for containing the food and bonding agent.

Feed plate means 23 may be advanced downwardly by the feed screw 95 until the feed peg end portions 63 are immersed in the food substance a selected distance to provide enough food for about 24 to 36 hours of feeding of the crustacean in a cell. After the feed pegs have been immersed in the food substance, the feed screw 95 may retract the feed plate means 23 to permit sufficient horizontal displacement of the top tray sections 121 to expose the channels of the middle tray section 122 and its bonding contents. The feed tray means may then be advanced downwardly by the feed screw means to immerse the food substances on the feed pegs into the bonding agent carried by the tray section 122. After sufficient immersion of the feed pegs in the bonding agent, the feed screws may retract the feed plate means 23 so that the middle section 122 may be sufficiently displaced beneath section 121 to expose the lower water carrying section 123 for dipping the pegs thereinto. Feed plate means 23 may then be rotated counterclockwise into the position shown in FIGS. 1 and 2.

The feed plate means 23 is then reassembled with the cage means 22 by advancement thereof by the feed screw 95 in a precise manner so that the feed pegs 51 are engaged with the feed port holes 50 in the cage means and the new food on the end of the food pegs is introduced into each of the cells 47. When the feed plate means 23 is in position on the cage means 22, the vacuum source may be relieved and the frame 91 withdrawn from its contact with the feed plate means 23. When the frame 91 and the suction cups carried thereby is fully retracted, the hoist means 26 may lower the cage means 22 with the feed plate means assembled therewith into the holding tank into its previously occupied position and then release the cage means. The gantry means 24 may then be forwardly advanced into its selected position over the next cage means in holding tank 21 and the cycle of operations described above repeated.

The method of applying the food substance to the feed pegs has been generally discussed above. In further detail, it will be understood that when the pegs are cleaned of uneaten food by the forceable spraying of water thereon by the nozzles 111, the feed plate means is moved to a position above the feed tray means 120. The food substance which contains a selected diet mixture suitable for the crustaceans to be fed also includes a sodium alginate, such food substance with alginate being contained in the upper tray 121. When upper tray 121 is horizontally displaced or removed to make available the lower tray 122 to the feed plate means, the feed pegs with the food substance thereon are lowered and dipped into calcium chloride contained in tray 122. The calcium chloride combines with the sodium alginate in the food substance to form an exterior film or skin on the food which serves to physically bind the food substance to the peg and to lock in or encapsulate the food substance thereon. After the film has been formed, the pegs are dipped into clean water carried in a third tray 123 positioned beneath tray 122 to remove any excess calcium chloride which has not combined with the sodium alginate. After removing the excess calcium chloride, the feed pegs with the encapsulated food thereon are in condition for assembly with the cage means, the food being securely held on the pegs during such operation. It will be apparent that after the feed plate means has been assembled with the cage means and both reintroduced into the holding tank that the film which has contained the food substance on the pegs will be readily available to the lobster in the cell. The feed ports 50 in the cage means have sufficient diameter to permit the feed pegs 51 with encapsulated food substance to pass through with ample tolerance.

The example of this invention described above exemplary refers to a cage means having approximately 162 cells and a feed plate means having 162 feed pegs all of which are handled as a unit with respect to removal from the cage means, cleaning and washing, application of food substances to all of the feed pegs at the same time, encapsulating the food substance on the feed pegs at the same time, and returning the feed plate means with 162 feed pegs to the cage means. When the apparatus is automated, the cycle for removal of a cage means from a holding tank to its immersion in the holding tank with new food on the feed pegs may be about 2 minutes. At this cyclic rate, aproximately 4800 lobsters may be fed in one hour. It will thus be apparent that depending upon the number of holding tanks and the number of gantrys equipped as above described that it is feasible to attend to the feeding of 100,000 or more lobsters in a daily feeding cycle.

A means for automatically controlling the several steps of the method of feeding lobsters as described above includes the console 125 mounted on the deck of the gantry means. A power source for automated operation of the apparatus may be readily supplied by overhead flexible power lines leading to the gantry and capable of moving with the gantry as it travels in step by step fashion along a line of holding tanks. It will be understood that the circuitry for the timed sequence control of the gantry driving motor, the hoist means, the feed plate handling means and the shutting and turning off of the cleansing spray may comprise various suitable well-known circuits and electrical equipment, such specific circuitry being not described in detail because it is felt to be not part of the subject matter of this invention. It will be understood that various automated systems and circuitries may be employed in operation of the apparatus and method described above.

While a preferred embodiment for the mass feeding of a large number of lobsters has been described above, it will be understood that the method of this invention may be operated manually with relatively few changes in apparatus. For example, the structure of the gantry means may be essentially the same in order to provide a movable carriage adapted to move along and over the open top hodling tanks. The hoist means 22 may be manually operated by a switch control for hoist motor 82 or the hoist means may be manually operated by a suitable crank means. The means 27 for handling the feed plate means 23 may be modified so that in place of the feed screw, the feed plate means may be equipped with suitable handles to facilitate manual withdrawing of the feed plate means from the cage means, the repositioning of the feed plate means in front of the spray nozzles which may be located elsewhere, as for example, alongside the gantry means. Further, after cleaning the feed plate means, the feed plate means may be manually dipped into the tray means for depositing and collecting food substances on the feed pegs, encapsulating the food substance in the second tray and then cleaning the calcium chloride therefrom in the sequence of steps hereinabove described, except that all of said steps may be manually performed. It will be understood that to facilitate handling, the feed plate means may be made in two or more sections to facilitate manual removal and manual replacement thereof after fresh food has been encapsulated on the ends of the feed pegs. Movement of the gantry means step by step along the line of holding tanks may also be accomplished by suitable manual means such as by pushing the gantry means to selected stops provided along the length of the holding tank means to facilitate its accurate positioning at each cage means.

It should also be noted that the cage means are so constructed with suitably located perforations in the walls of the cells therein that when the cage means are lifted out of the water, the depth of water in each cell drains out of the perforations in a flushing action which serves to cleanse the cell. The lifting action produces sufficient turbulence of water in the cell to produce agitation of the water and the removal of sediment and loose particulate matter.

It may be further noted that the feed pegs may be modified in form to be cooperable with the feed ports and may include channel-like portions for carrying the food substance, a tube-like configuration into and through which food may be introduced, and other elongated transport means for carrying and introducing food through the feed ports into each cell.

Various modifications and changes may be made in the apparatus and in the method described above in order to accomplish mass feeding of lobsters or other crustaceans and all such changes and modifications coming within the spirit of this invention and within the appended claims are embraced thereby.

I claim:

1. An aquaculture apparatus for raising crustaceans such as lobsters comprising, in combination:
    a holding tank means having an open top and provided with water of selected temperature adapted to be circulated therethrough;
    a plurality of independent separable cage means positioned in said tank in spaced relation, each cage means providing for circulation of water therethrough;
    a plurality of individual entirely enclosed cells in each cage means, each cell having a feed port in one wall thereof;
    a feed plate rack means having food carrying pegs each adapted to extend into and through a feed port in a cell;
    a gantry means movable over and along said holding tank means;
    and means on said gantry means for attachment to each cage means for raising said cage means out of said holding tank for removal and positioning of said feed plate means for exposing said feed pegs for cleaning and replenishing the food substance thereon.

2. An apparatus as stated in claim 1 including means carried by said gantry means for releasable attachment to said feed plate means for removal thereof from said cage means.

3. An apparatus as stated in claim 2 including means on said gantry means for cleaning said feed pegs when said feed plate means is moved into one position by said attachment means on said gantry means.

4. An apparatus as stated in claim 2 including tray means on said gantry means cooperable with said attachment means for encapsulating food substances on said feed pegs.

5. An apparatus as stated in claim 1 wherein said attachment means includes suction means for engagement with juxtaposed surfaces of said feed rack means for releasably holding said feed rack in each position thereof.

6. An apparatus as stated in claim 1 wherein said attachment means includes a feed screw for moving said feed rack means into and away from each of said positions.

7. An apparatus as stated in claim 3 wherein said position for cleaning said feed rack includes
means for forceably directing a stream of cleaning fluid against said feed rack in said position.

8. An apparatus as stated in claims 1, or 2, or 3, or 4 wherein said gantry means includes
control means for operation of each of said means in accordance with a selected sequence.

9. An apparatus as stated in claim 1, wherein said gantry means includes control means for movement along said holding tank in step by step fashion for lifting successive cage means out of said holding tank.

10. In an aquaculture farm for raising crustaceans such as lobsters a method and system of feeding of said lobsters in which a holding tank with circulating water therein is provided with a plurality of submerged cages containing a plurality of cells each adapted to contain a lobster, and feed racks having feed pegs associated with said cells, comprising the steps of:
raising each cage out of the water of said tank;
moving the associated feed rack on said cage from its feed position in the cage and into spaced relation to said cage;
moving said feed rack to a second position for washing and cleaning said feed rack;
moving said feed rack to a third position over a food containing tray;
immersing the feed pegs into said food tray a selected distance and adhering said food to said pegs;
removing the feed rack from said food tray and moving the feed rack to a position opposite the raised cage;
positioning and aligning the feed rack with the cage;
and moving the feed rack towards the cage to position the feed pegs in the cells.

11. In a method and system of individual feeding of a large number of lobsters simultaneously in which each lobster is in an individual cell provided in a cage means having a plurality of such cells, and in which said cage means are held in an open top holding tank with circulating water therein, each cage means having feed racks with a plurality of feed pegs associated with said individual cells, the steps of:
lifting each cage means out of the water of a holding tank;
removing the feed rack from said cage means; cleaning and washing the feed pegs on said feed rack;
replenishing the food substance on the feed pegs;
encapsulating the food substance on said pegs;
returning the feed rack to the cage means and inserting said feed pegs into their respective cage means; and
lowering the cage means into said holding tank.

12. A method as stated in claim 10 wherein the step of cleaning and washing said feed pegs includes:
directing a spray of washing fluid against said feed rack and feed pegs.

13. A method as stated in claim 11 wherein the step of replenishing the food substance includes:
dipping the feed pegs into a tray containing a food substance and an alginate,
and then dipping the pegs into a calcium chloride solution to form a gel over the food substance to bind the food substance to the peg.

14. A method as stated in claim 11 wherein the step of replenishing the food substance includes:
binding the food substance to the feed pegs.

15. In an aquaculture apparatus for raising crustaceans, such as, lobsters, comprising in combination:
a cage means having a plurality of individual enclosed cells arranged in rows, each cell having a wall provided with a feed port, said walls lying in the same planar zone;
a planar feed rack means including a plate positionable in a planar zone parallel to the planar zone of said walls,
said plate having elongated feed pegs extending from one face thereof and adapted to carry food adjacent their ends,
each feed peg being adapted to extend into and through a feed port of a cell by movement of the rack means along a path normal to said planar zones;
said feed pegs having portions adjacent said plate cooperable with the feed ports to support said feed rack means in assembly with the cage means;
said planar feed rack means being adapted to be moved away from said planar zone of said walls for exposing said feed pegs for cleaning thereof and for replenishing food substances thereon.

16. In an apparatus as stated in claim 15 including means on said plate for spacing said plate from said walls of said cage means in assembled relation therewith.

17. In an apparatus as stated in claim 15 including means on said plate cooperable with edge walls of said cage means for registration of said plate and feed pegs with said feed ports.

18. In an apparatus as stated in claim 15 including means for withdrawing said feed rack means away from said cage means.

19. In an apparatus as stated in claim 18 wherein said means for withdrawal of said rack means includes
suction cup means for contacting the surface of said plate opposite to said feed pegs for supporting said plate in disassembly with the cage means.

20. In an apparatus as stated in claim 18 including means for manipulating said feed rack means in withdrawn position into positions other than said parallel planar position with said walls of said cage means for cleaning said feed pegs.

21. In an apparatus as stated in claim 18 wherein said means for withdrawing said rack means away from said cage means includes
a gantry means having means for raising said cage means with said rack means in assembly therewith and means for separation of said rack means from said cage means.

22. In an apparatus as stated in claim 20 including means at one of said other positions for spraying said feed pegs on said feed rack means with a cleansing fluid for cleaning said feed pegs.

23. In an apparatus as stated in claim 20 including means at another one of said positions of said rack means for replenishing the food substances on said feed pegs.

24. In an apparatus as stated in claim 23 wherein said means for replenishing said food substances includes tray means containing said food substance;
and means for applying said food substance to said feed pegs.

25. In an apparatus as stated in claim 24 wherein said tray means includes a plurality of superimposed tray means adapted to be displaced relative to each other for exposing a selected food tray to said feed pegs for dipping of said feed pegs thereinto.

* * * * *